United States Patent [19]

Nevitt

[11] Patent Number: 5,417,067
[45] Date of Patent: May 23, 1995

[54] MASTER CYLINDER PISTON

[75] Inventor: Thad A. Nevitt, South Bend, Ind.

[73] Assignee: AlliedSignal Inc., Morristown, N.J.

[21] Appl. No.: 217,997

[22] Filed: Mar. 25, 1994

[51] Int. Cl.6 .......................... B60T 11/26; B60T 11/28
[52] U.S. Cl. ........................................ 60/588; 60/589; 60/562
[58] Field of Search .................. 60/562, 585, 588, 589

[56] References Cited

U.S. PATENT DOCUMENTS

| 4,267,697 | 5/1981 | Hodkinson | 60/589 |
| 4,756,160 | 7/1988 | Wimbush | 60/589 |
| 4,918,922 | 4/1990 | Nakano et al. | 60/589 |
| 5,214,917 | 6/1993 | Crumb et al. | 60/562 |
| 5,279,125 | 1/1994 | Keyes et al. | 60/562 |

Primary Examiner—Edward K. Look
Assistant Examiner—Hoang Nguyen
Attorney, Agent, or Firm—Leo H. McCormick, Jr.; Larry J. Palguta

[57] ABSTRACT

A piston arrangement for a master cylinder having a pin for linking a center compensation valve in primary and secondary pistons with a stop members. The primary and secondary each have a pin located in a blind bore which has a cylindrical body with a first semi-spherical head on a first end and a second semi-spherical head located on a second end. A valve return spring acts on a poppet assembly of each compensation valve to position a stem between the first and second semi-spherical heads to hold the pins in the primary and secondary pistons. When a piston return spring moves the primary and secondary pistons toward a rest position, the second semi-spherical heads are held stationary as the pins pivots about the first semi-spherical heads to act on stems and move poppets away from seats and communicate fluid from a source to pressurizing chambers associated with the primary and secondary pistons.

3 Claims, 2 Drawing Sheets

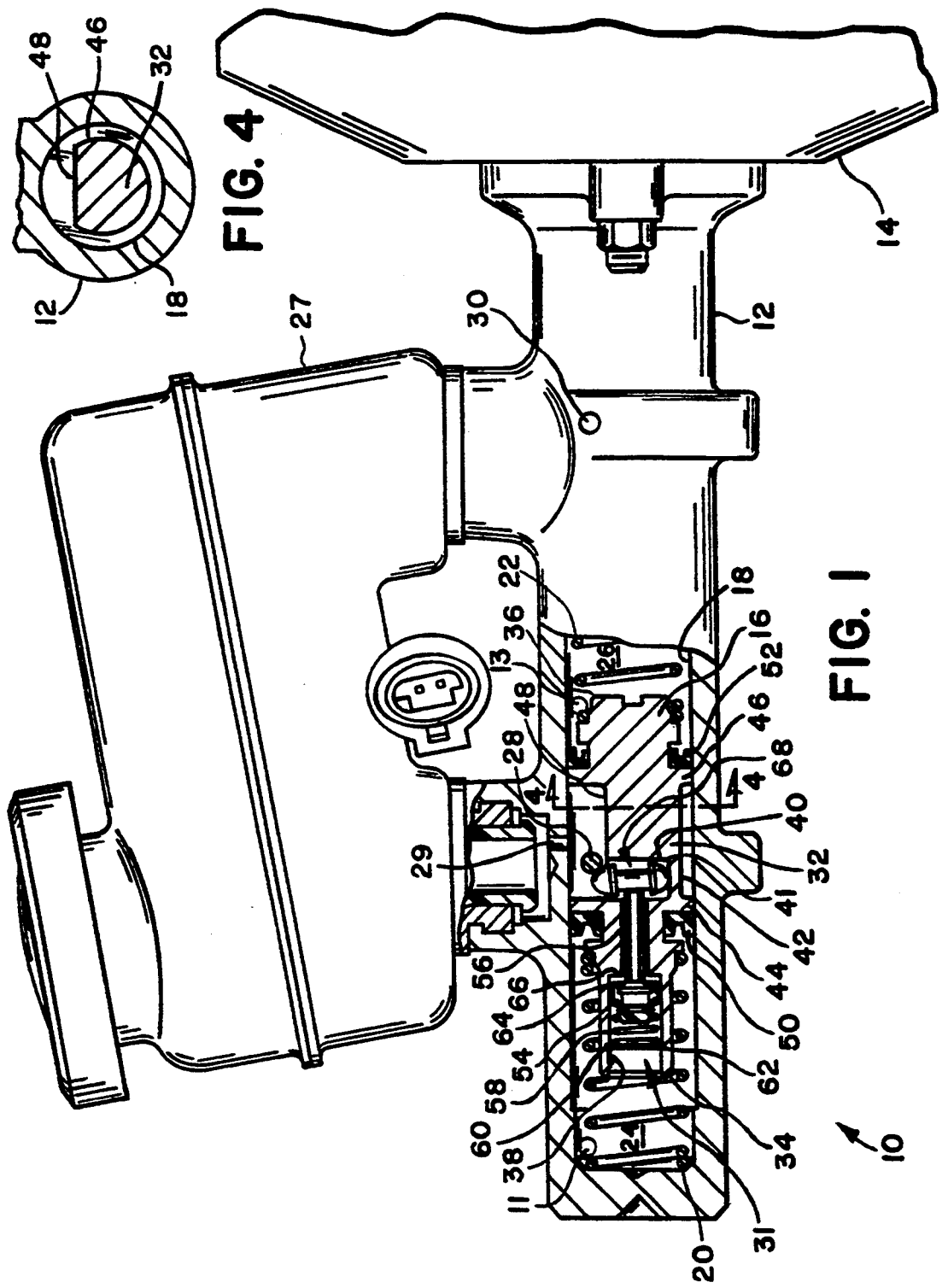

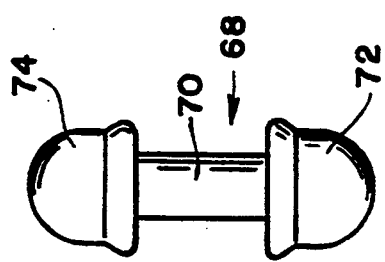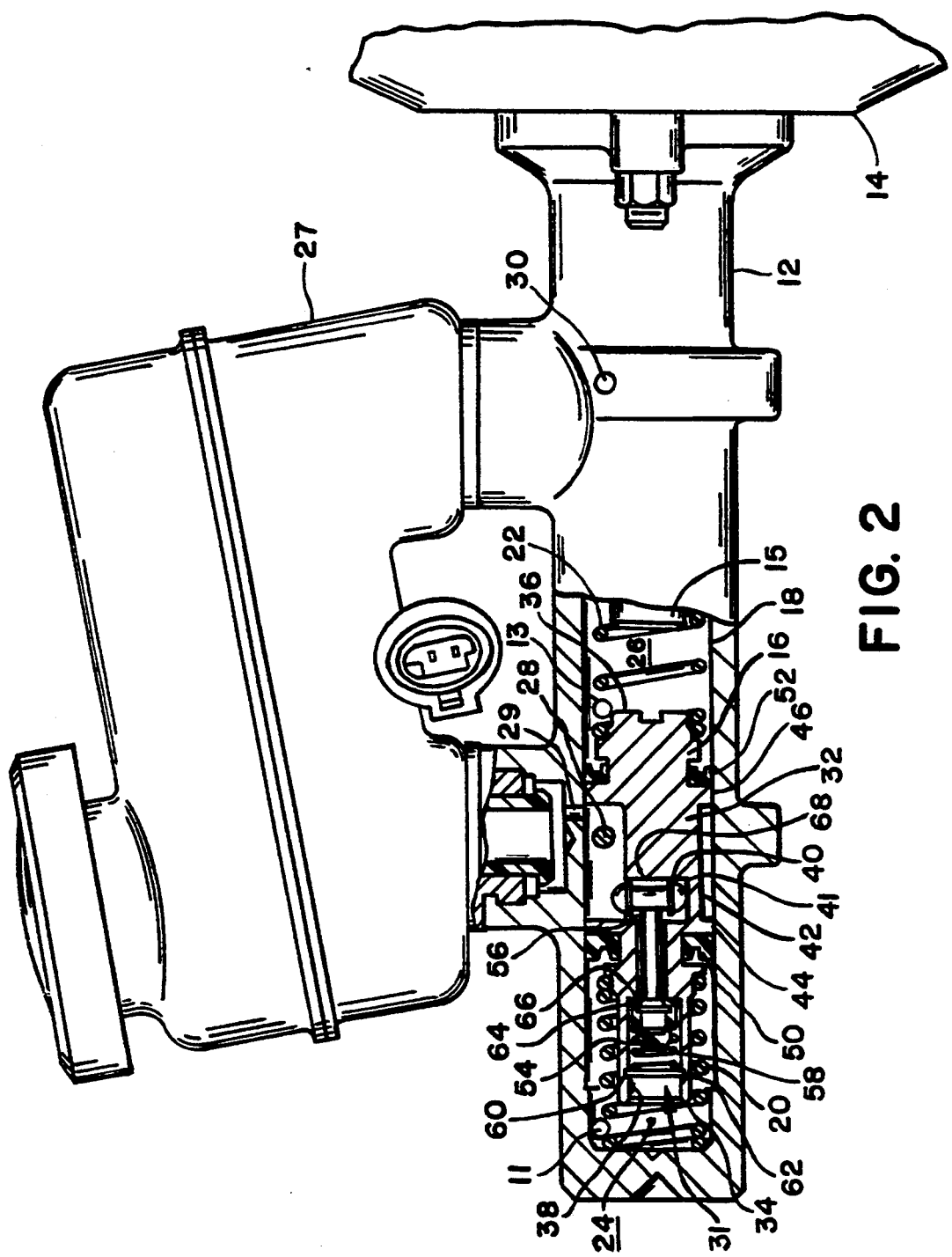

MASTER CYLINDER PISTON

This invention relates to a piston arrangement for master cylinder having pins for actuation of a center compensation valve in the primary and secondary through which fluid from a source is communicated to pressurizing chambers when the primary and secondary pistons are in the rest position.

BACKGROUND OF THE INVENTION

Pistons with center compensation valves through which a pressurizing chamber of a master cylinder is connected to a reservoir have been disclosed in U.S. Pat. Nos. 5,214,917 and 5,279,125. These master cylinders function in an adequate manner to provide a reduction in the compensation travel required before pressurization of the fluid in the operational chambers occurs in response to an input force. The pistons In such master cylinders are made from a single casting that requires several milling operations to develop a radial slot that is connected to an axial bore where the compensation valve is located. The time and effort associated with the milling operations adds considerable cost to the manufacture of such pistons.

SUMMARY OF THE INVENTION

The present invention provides a method of manufacturing a master cylinder essentially using a cast piston and associated compensation valve which requires minimal milling efforts while at the same time functioning in a desired manner of limiting travel required to operate the compensation valve. The piston has a cylindrical body with a stepped axial bore that extends to a blind radial bore. The piston is urged by a piston return spring toward a rest position which is defined by a stop member fixed to the housing of the master cylinder. Pin means located in the blind radial bore forms linkage through which the stop member is connected to the compensation valve to allow fluid communication from a souse to the pressurizing chamber associated with piston. The pin means moves with the piston and out of contact with the stop member to allow a valve return to urge the compensation valve into engagement with the housing an initiate immediate build up of pressurized fluid in the chamber in response to an input force. On termination of the input force, the when the piston approaches the rest position, a first end of the loin means pivots in the blind radial bore when a second end engages the stop member to move the compensation valve away from the seat and reestablish communication from the source to the pressurizing chamber by way of the radial and blind bores.

One way of carrying out the invention is described in detail below with reference to the drawings which illustrate such a master cylinder.

BRIEF DESCRIPTION OF THE DRAWINGS

FIG. 1 is a schematic illustration of a master cylinder having a piston and compensation valve arrangement as defined by the present invention;

FIG. 2 is a sectional view taken along lines 2—2 of FIG. 1;

FIG. 3 is a perspective view of an actuation pin through which an input is applied to the compensation valve of FIG. 1; and FIG. 4 is a schematic illustration of the master cylinder of FIG. 1 in an actuated situation.

DETAILED DESCRIPTION OF THE INVENTION

In this specification, the tandem master cylinder with center compensation valves in the primary and secondary pistons made according to this invention is referenced by numeral 10. Master cylinder 10 includes a housing 12 connected to a brake booster 14 through which an input force is applied to move a primary piston 15 and a secondary pistons 16 located in bore 18 of housing 12. Return springs 20 and 22 located in bore 18 position the primary 15 and secondary 16 pistons to define pressurizing chambers 24 and 26 in housing 12. Stop members 28 and 30 which are fixed to housing 12 limit the movement of the primary 15 and secondary 16 pistons by return springs 20 and 22 in bore 18. Bore 18 is connected to a reservoir 27 which retains a supply of fluid for maintaining the fluid in chambers 24 and 26 in a full condition. A center compensation valve located in the primary piston 15 and a center compensation valve 31 located in the secondary piston 16 control the communication of the supply fluid from reservoir 27 to chambers 24 and 26.

The relationship between the center compensation valve and the primary 15 and secondary 16 pistons is identical and the components identified in the drawing of FIGS. 1, 2, 3 and 4 with respect to compensation valve 31 for the secondary piston 16 is equally applicable for the compensation valve for the primary piston 15.

As illustrated in FIGS. 1, 2 and 3, the secondary piston 16 has a cylindrical body 32 with a first end 34 and a second end 36. An axial bore 38 extends from the first end 34 to a radial bore 40 connected to groove 42 located between lands 44 and 46. The cylindrical body 32 has a flat surface 48 located between lands 44 and 46 as best shown in FIG. 2. The relationship between flat surface 48 and stop pin 28 locates piston 16 in bore 18 is illustrated in FIGS. 1 and 2 such the radial bore 40 is maintained in a perpendicular position by stop member or pin 28 to aid in removing air from chamber 24. Seals 50 and 52 which located on the peripheral surface of cylindrical body 32 engage housing 12 and prevent communication between chamber 24 and groove 42. All communication from chamber 24 to groove 42 is through axial bore 38 and radial bore 40 as a function of the position of compensation valve 31.

The compensation valve 31 comprises a poppet member 54 attached to a stem 56 and a valve return spring 58. The stem 56 being located in axial bore 38 and extending into radial bore 40 while return spring 58 has a retainer 60 on a first end located in a groove 62 and a free end that engages the popper member 54 to urge face 64 toward a seat 66.

Compensation valve 31 is connected to the stop pin 28 by linkages comprising pin means 68 as best shown in FIG. 3. Pin means 68 has a cylindrical body 70 with a first semi-spherical head 72 located on a first end and a second semi-spherical head 74 located on a second end. Heads 72 and 74 are identical such that either would perform in the same manner when located in radial bore 40 in cylindrical body 32. The diameter of heads 72 and 74 is slightly less that the diameter of radial bore 40 in order for some movement to occur there between as later explained. Further, pin means 66 is retained in radial bore 40 by the engagement of stem 56 such that on initial insertion of pin means 66 into radial bore 40, semi-spherical head 72 acts on stem 56 to compress spring 58 allowing head 72 to be located at the bottom 41 of the radial bore 40. After head 72 passes stem 56, spring 58 moves stem 56 into bore 40 and into engagement with cylindrical body 70. The length of stem 56 is selected such that when spring 58 brings face 64 into engagement with seat 66 their is still some clearance between the first 72 and second 74 semi-spherical members and bore 40 to assure that chamber 24 is sealed from groove 42. The dumb bell shape of pin means 68 is considered to be the best mode of carrying out this invention, however it is anticipated that a cylinder, rectangular or wedge shape would perform in an equivalent manner.

MODE OF OPERATION OF THE INVENTION

In the master cylinder 10 shown in FIG. 1 the secondary 16 and primary 15 pistons are urged toward the rest position with return springs 20 and 22. In the rest position, semi-spherical head 74 on pin means 68 engages stop member or pin 28 while semi-spherical head 72 engages cylindrical body 32 and urges stem 56 toward chamber 24 after compressing valve spring 58 to move face 64 away from seat 66 and provide free communication from reservoir 27 to chamber 24 by way of port 29, bore 18, groove 42, radial bore 40 and axial bore 38. In the rest position shown in FIG. 1, any fluid lost from a brake system connected to outlet port 11 of housing 12 is replenished such that chamber 24 is always in the full condition as long as fluid is in the reservoir. Similarly, a compensation valve associated with the primary 15 piston provided for communication to chamber 26 to replenish fluid lost by the brake system through outlet port 13.

In response to an input force applied to effect a brake application, the output from the brake booster 14 is communicated to the master cylinder 10 and in particular the primary 15 and secondary 16 pistons located in bore 18 for pressurizing fluid in chambers 24 and 26. The input to primary 15 piston is communicated to the secondary piston 16 by spring 22 such that spring 20 is compressed and cylindrical body 32 moves toward chamber 24 to pressurize the fluid therein. However before any pressurization can occur, fluid communication through axial bore 38 must terminate as a function of the seating of compensation valve 31. As shown in FIG. 4, initial movement of cylindrical body 32, allows valve spring 58 to move face 64 on poppet 54 into engagement with seat 66 to interrupt communication through bore 38 since semi-spherical heads 72 and 74 are slightly smaller in diameter than radial bore 40 to allow for such seating to occur, this movement being the compensation valve closure travel. Similarly, compensation valve associated with the primary 15 piston is seated to interrupt communication with reservoir 28.

On termination of the input force to the primary 15 and secondary pistons 16, return springs 20 and 22 move the primary 15 and secondary pistons 16 toward the rest position as shown in FIG. 1. As the primary 15 and secondary 16 pistons approach the rest position, the compensation valve are opened to communicate fluid from reservoir 27 to chambers 24 and 26 in the following manner as described with respect to compensation valve 31 and secondary piston 16. Semi-spherical head 74 engages stop member or pin 28 and holds this end stationary as cylindrical body 32 continues to move toward the rest position. With spherical head 74 stationary, pin means 68 pivots about semi-spherical end 72 to move stem 56 toward end 34 of the cylindrical body 32 after overcoming valve return spring 58. As stem 58 moves, face 64 is moved away from seat 66 to allows free communication of fluid from reservoir 27 to chamber 24.

Pistons assemblies manufactured according to the invention described above provide for a lower cost in manufacturing a master cylinder while still providing fast actuation without loss of travel associated as achieved through center compensation valves.

I claim:

1. A piston arrangement located in a bore of a housing of a master cylinder and having a center compensation valve retained therein through which a source of fluid is communicated to a pressurizing chamber, said piston arrangement being urged by a piston return spring toward a rest position defined by a stop member, said compensation valve engaging said stop member when said piston arrangement approaches said rest position to allow communication of said source of fluid to said pressurizing chamber, said compensation valve being urged toward a seat by a valve return spring to interrupt communication of fluid from said source to said pressurizing chamber in response to movement of said piston arrangement by an input force, the improvement comprising a pin through which said stop member is connected to said compensation valve, said pin having a first end located in a blind bore in said piston arrangement and a second end that extends into said bore of the master cylinder, said pin having a cylindrical body with a first semi-spherical head located on said first end and a second semi-spherical head located on said second end, said compensating valve having a stem that extends into said blind bore and engages said cylindrical body, said first semi-spherical head engaging said stem to retain said pin in said blind bore, said pin moving with said piston arrangement and second semi-spherical head engaging said stop member when said piston arrangement approaches said rest position, said pin being pivoting about said first semi-spherical head when said piston is in the rest position to move said compensation valve away from said seat to establish communication from said source to said pressurizing chamber by way of said blind bore.

2. The piston arrangement as recited in claim 1 wherein said stop member is located in a plane perpendicular to said pin and said stem is located in a plane perpendicular to said pin.

3. The piston arrangement as recited in claim 1 wherein said cylindrical body of said pin has a diameter which is smaller than said blind bore to allow said pin to pivot around said first semi-spherical head after said second semi-spherical head engages and is held stationary by said stop member as said piston approaches its said rest position to correspondingly move a stem connected with a poppet of said compensation valve and allow said communication from said source to said pressurizing chamber.

* * * * *